Patented Aug. 12, 1930

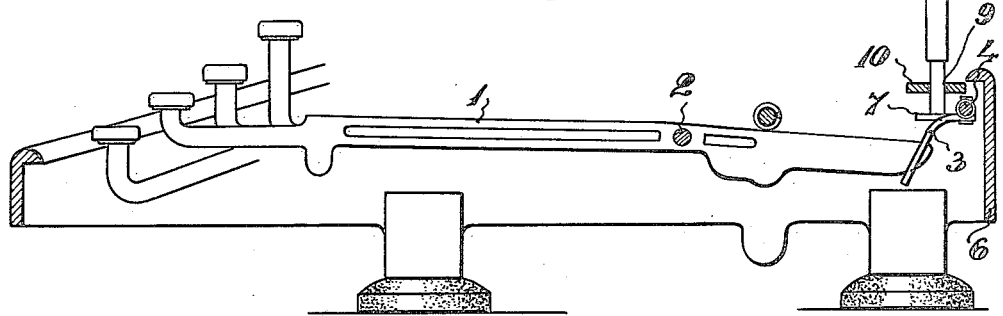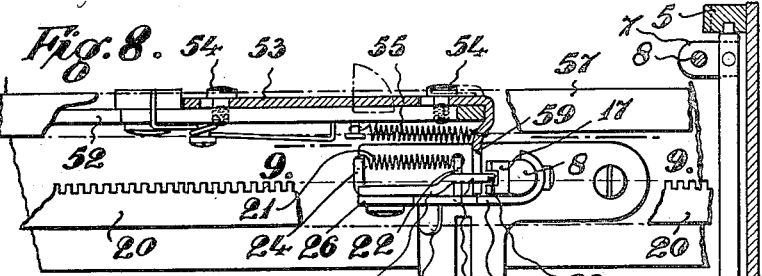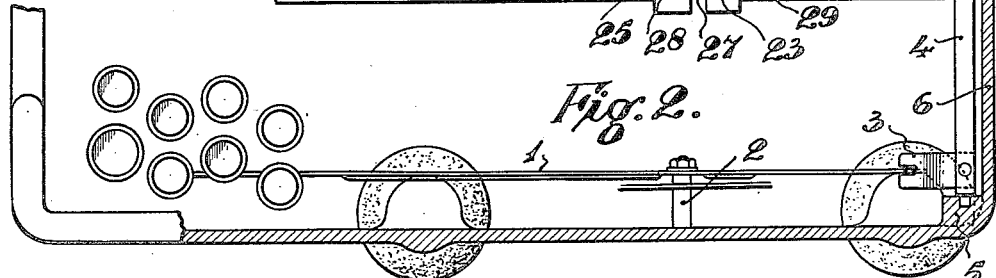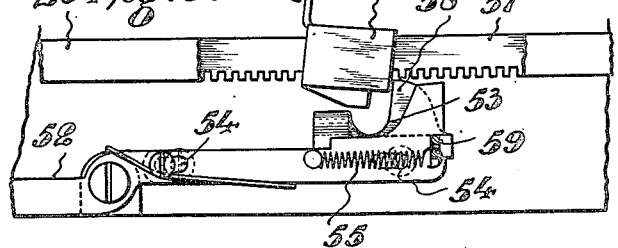

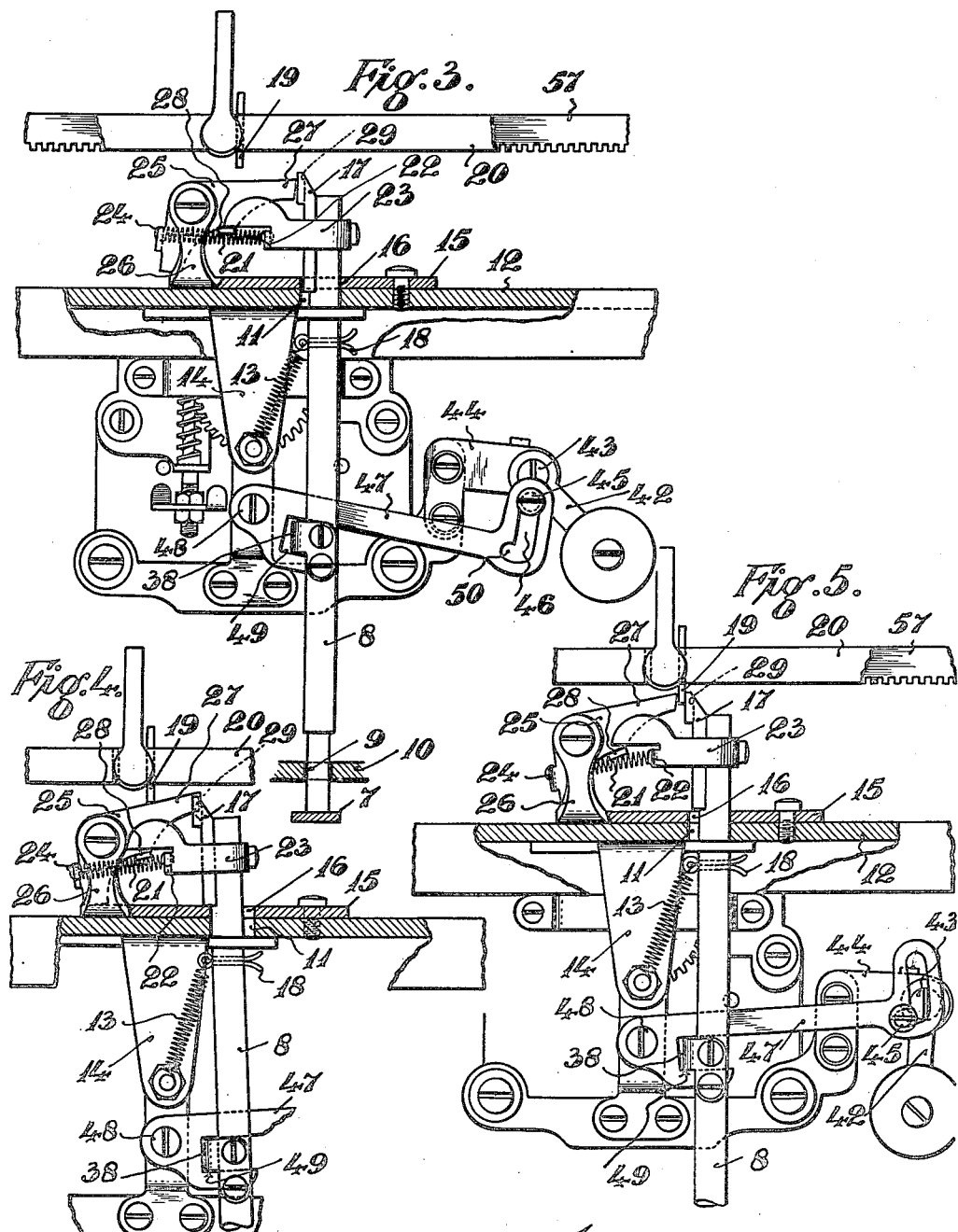

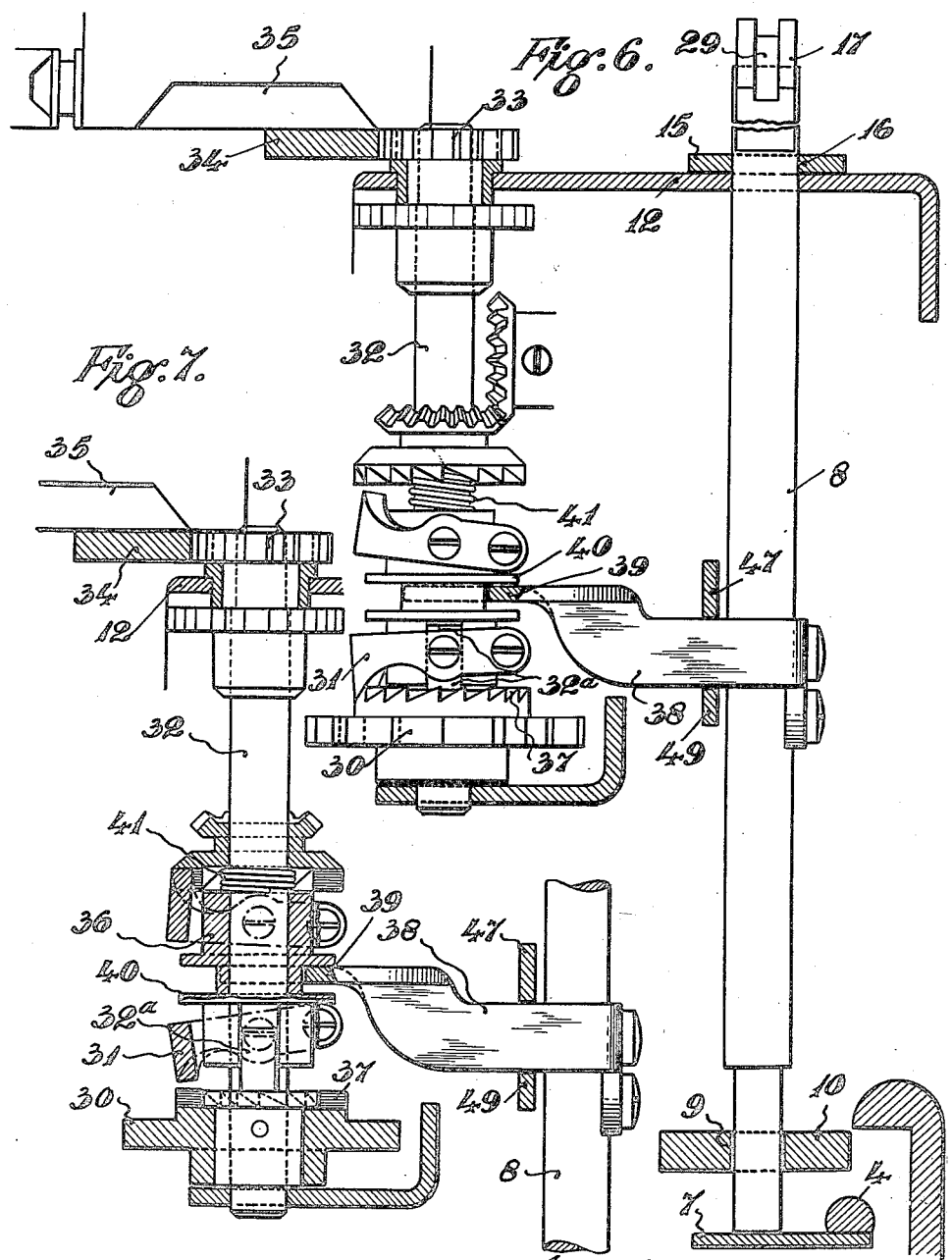

1,772,768

UNITED STATES PATENT OFFICE

ERNEST WILLIAM BACHE AND JOHN GRICE, OF WEST BROMWICH, ENGLAND, ASSIGNORS TO GEORGE SALTER AND COMPANY LIMITED, OF WEST BROMWICH, ENGLAND

TABULATING MECHANISM OF TYPEWRITING MACHINES

Application filed April 20, 1928, Serial No. 271,605, and in Great Britain June 21, 1927.

This invention relates to tabulating-mechanism of typewriting machines wherein the depression of a tabulating key releases the carriage from the escapement mechanism and allows it to move forward until arrested by a stop.

The objects of the present invention are to provide improved tabulating mechanism which is efficient and reliable in action, and to improve the rebound stop device which is employed to prevent the rebound of the carriage when it strikes the tabulating dog.

Figure 1 of the accompanying drawings is a cross-section through a typewriter provided with the improved tabulating mechanism, the tabulator key-lever and lower part of the tabulator dog-pillar being shown in elevation.

Figure 2 is a horizontal sectional view showing in plan the tabulating key-lever and the rocking shaft by which the tabulator dog-pillar is operated.

Figure 3 is a longitudinal section through the rear part of the typewriter frame showing in elevation the tabulator dog or stop mechanism. This view shows the parts in their normal or inoperative positions, before the tabulating key is depressed.

Figure 4 is a similar view but shows the tabulating dog elevated into and retained in its operative position, but before being engaged by the tabulating stop on the carriage.

Figure 5 shows the tabulating dog engaged by the stop on the carriage and the rebound stop in operation.

Figure 6 is a transverse section showing the controlling connection between the dog-pillar and the escapement, the latter being shown in its operative condition when the dog-pillar is lowered.

Figure 7 is a similar view, but shows the escapement mechanism in section and disengaged from the carriage, as when the tabulator dog is raised.

Figure 8 is a plan view of the tabulator dog and rebound stop, showing also the means for releasing the said dog by the margin stop.

Figure 9 is a vertical section on line 9—9, Figure 8, showing the margin-stop device for releasing the tabulating dog.

Referring to the said drawings, the tabulating key-lever 1, which is pivoted at 2 to the side of the machine frame, engages and operates a forwardly-extending arm 3 on one end of a horizontal rock-shaft 4 mounted in bearings 5, 5, so as to lie parallel and adjacent to the rear side of the base frame 6 of the typewriter. The said rock-shaft 4 carries at the end opposite to the arm 3 another forwardly-extending arm 7 engaging beneath the lower end of a vertically-sliding dog-pillar 8 moving within a guide aperture 9 in a horizontal bottom rail 10 at the back of the machine, and also within a guide aperture 11 in a top plate 12 (Figure 3). Attached to the sliding pillar 8 by a pin 18 is a coiled tension spring 13 the lower end of which is anchored to a bracket 14 depending from the said top plate 12 so that the spring tends to lower the pillar. The guide aperture 11 in the top plate is elongated in the form of a laterally-extending slot, and upon the said top plate a similarly slotted steel wearing plate 15 is fixed, the slot 16 therein registering with the slot 11. Secured to one side of the projecting upper end of the pillar 8 is the tabulating dog 17, consisting of a short bar with a bevelled upper end. The lower end of this dog normally (that is, when the pillar 8 is lowered) engages within one end of the slot 16, in the aforesaid steel wearing plate 15 as shown in Figure 3, but when the pillar is raised by the depression of the tabulating-key the lower end of the dog comes above the top face of the slotted plate 15, clear of the slot 16, so that the upper end of the pillar can now be moved laterally to occupy the end of the slot previously occupied by the dog 17, bringing the said dog over the solid portion of the slotted plate, as shown in Figure 5, so that if the tabulating key is now released the dog 17 will rest on the plate 15 and act as a catch device, and the pillar 8 will be held in its elevated position with the dog situated in the path of the usual tabulating stop or stops 19, on the tabulating rail 20 of the carriage. These stops may be of any suitable type, being adjustable to different positions along the said tabulating rail. The lateral shifting of the dog-pillar 8, to maintain it in its raised position as above referred to, is effected by the oblique pull of the spring 13 assisted by a horizontal spring 21. This spring 21 is attached at one end to an inwardly-extending lug 22 on a laterally-projecting arm 23 fixed to the dog-pillar 8, and is anchored at its opposite end to an inturned lug 24 on a rebound-preventing stop-lever 25 fulcrumed on a bracket 26 carried by the top plate 15. The stop-lever 25 is disposed in a lateral direction and has a nose end 27 located adjacent the tabulating dog 17. The end of the arm 23 on the pillar engages over a lug 28 on the lever 25, so that when the pillar 8 is lowered, the lever 25 is also lowered, as shown in Figure 3; but when the pillar and dog are raised, the spring 21 acts not only to shift the dog laterally but also causes an angular movement of the stop lever 25, thus elevating the nose end 27, as in Figure 5, until the lower end of the lever abuts upon the plate 15, thus limiting the upward movement of the nose, which is brought to rest in the path of the stop 19 on the carriage. The upper end of the dog 17 may be slotted at 29 to receive the nose of the lever 25 in the position shown in Figure 4.

The raising of the dog-pillar 8 is arranged to disconnect the carriage from the escapement. In the arrangement shown a horizontal escapement wheel 30 (see Figures 6 and 7) is driven through the medium of a pawl 31, from a vertical shaft 32 carrying at its upper end a pinion 33 gearing with a rack 34 on the carriage 35. The pawl 31 is carried by a vertically-sliding sleeve 36 which is feathered on the said shaft 32 by its slotted lower end slidably engaging clutch dogs 32ª on a collar fixed to the shaft, and engages a ring of ratchet teeth 37 on the top edge of a boss on the escapement wheel. The dog-pillar 8 is provided with a forwardly extending arm 38 terminating in a fork 39 embracing a collar 40 on the pawl-sleeve 36, so that when the pillar is raised the sleeve 36 is raised against the action of a spring 41 and the pawl 31 is lifted out of engagement with the ratchet teeth 37. The carriage 35 is thus released, and moves forward under the influence of its spring.

The operation of the tabulating-mechanism is thus as follows:—To bring the carriage to the desired tabulating position, the tabulating-key on the key-lever 1 is depressed and immediately released. The depression of the key causes the tabulating dog or abutment 17 to be raised into the path of the carriage stop 19, as above described, and at the same time the carriage-controlling pawl 31 is lifted out of engagement with the escapement wheel 30, thus releasing the carriage. The latter then moves forwards until the carriage stop 19 first wipes past the rebound stop-lever 25 (which is in the position shown in Figure 4) and then impinges against the elevated dog 17. This impingement moves the dog and pillar laterally, into the position shown in Figure 5. Immediately the dog 17 is thus struck by the carriage stop, the nose end 27 of the rebound stop-lever 25 is raised by the action of the spring 21 into a position immediately behind the stop 19, as indicated in Figure 5, and thus prevents the carriage rebounding from the said dog. The latter is then lowered by its spring 13, thus restoring the connection between the carriage and the escapement (due to the lowering of the pawl-sleeve 36) and also returning the tabulating-key to its raised position. After the dog 17 has been lowered a short distance the stop-lever 25 is also lowered by reason of the arm 23 on the pillar 8 engaging the lug 28 on the said lever.

In order to control the initial descent of the dog-pillar 8 and prevent the dog from leaving the stop 19 too soon, a retarding device is provided consisting of a weighted bell-crank lever 42 pivoted at 43 to a bracket 44 on the escapement bracket and having a pin 45 on its short arm engaging a slot 46 in the upturned end of a lever 47 pivoted at 48 on the escapement bracket and having a gapped part or fork 49 engaged by the arm 38 on the pillar 8. At the lower end of the slot 46 is a lateral recess 50. Normally the weighted lever 42 occupies the position shown in Figure 3, the pin 45 being at the upper end of the slot 46, but when the dog 17 is raised, the slotted end of the lever 47 is lifted so that the weighted bell-crank lever 42 can swing downwards into a vertical position, with the pin 45 engaging the recess 50 in the slot, as shown in Figure 5. When the pillar 8 descends it lowers the lever 47 which, acting on the short arm of the bell-crank lever, causes the weighted arm 42 to be raised, the pin 45 swinging out of the recess 50, and the resistance thereby offered gives the necessary control to the downward movement of the dog.

In order to lower the tabulating dog 17 in the event of its being raised after the last tabulating stop on the carriage has passed it, the margin stop on the carriage is utilized. For this purpose (see Figures 8 and 9) the margin-stop release lever 52 upon the frame carries a slide 53 guided by pins 54 engaging slots, and controlled by a spring 55. The margin stop-piece 56 on the margin rail 57 of the carriage is adapted to engage an upstanding lug 58 on the slide so as to move the slide forwardly. The said slide has an outwardly-bent arm 59 at its end, and when the slide is thus operated by the margin stop, the said arm moves laterally and impinges against the pillar 8 in order to shift the same laterally and cause the dog to be lowered.

Instead of the escapement mechanism and carriage-driving means being of the kind above referred to, it may be of any other suitable type, the carriage being arranged to be disconnected from the said escapement when the tabulating key is depressed.

Having fully described our invention, what we desire to claim and secure by Letters Patent is:—

1. Tabulating mechanism of typewriting machines comprising, in combination with a spring-driven paper-carriage controlled by an escapement device, a tabulating key, a vertically and laterally movable pillar carrying a tabulating dog, means whereby the said pillar and dog are raised when the tabulating key is depressed, a member on the frame of the machine serving to guide the pillar, means whereby the paper-carriage is disconnected from the escapement device when the pillar and dog are raised and is re-connected thereto when the pillar and dog are lowered, a projecting part on the pillar adapted, when the pillar is raised, to move over and rest upon the guide member on the frame so that the pillar is held in its raised position, a stop on the paper-carriage adapted to engage the raised dog during the travel of the said carriage and to release the dog from its raised position, a spring which acts upon the pillar in order to lower the same when the dog is engaged and released by the stop on the paper-carriage, a bracket on the frame, a pawl pivoted on the bracket for co-operation with the stop on the paper-carriage to prevent rebound of the said carriage when the said stop strikes the tabulating dog, said pawl having a depending lower end adapted to form a stop for limiting the upward movement of the dog, a lateral arm on the vertically-movable pillar, a projection on the pawl normally engaged on its upper face by the said arm so that the pawl is out of the path of the stop on the paper-carriage, and a spring connected between the depending lower end of the pawl and the lateral arm of the pillar so as to raise the said pawl into its operative position when the dog is lifted, the said lateral arm on the pillar engaging with the projection on the pawl when the dog descends so as to lower the pawl.

2. Tabulating mechanism of typewriting machines comprising, in combination with a spring-driven paper-carriage controlled by an escapement device, a tabulating key, a vertically-movable pillar carrying a tabulating dog, means whereby the said pillar and dog are raised when the tabulating key is depressed, means whereby the paper-carriage is disconnected from the escapement device when the pillar and dog are raised and is re-connected thereto when the pillar and dog are lowered, means independent of the tabulating key for causing the pillar to be held in its raised position, a stop on the paper-carriage adapted to engage the raised dog during the travel of the said carriage and to release the dog from its raised position, a spring which acts upon the pillar in order to lower the same when the dog is engaged and released by the stop on the paper-carriage, and a weighted lever operatively connected to the vertically-movable pillar so as to control the descent of the said pillar.

3. Tabulating mechanism of typewriting machines comprising, in combination with a spring-driven paper carriage controlled by an escapement device, a tabulating key, a vertically-movable pillar carrying a tabulating dog, means whereby the said pillar and dog are raised when the tabulating key is depressed, means whereby the paper-carriage is disconnected from the escapement device when the pillar and dog are raised and is re-connected thereto when the pillar and dog are lowered, means independent of the tabulating key for causing the pillar to be held in its raised position, a stop on the paper-carriage adapted to engage the raised dog during the travel of the said carriage and to release the dog from its raised position, a spring which acts upon the pillar in order to lower the same when the dog is engaged and released by the stop on the paper-carriage, a substantially horizontal lever operated by the vertically-movable pillar said lever having at its outer end an upwardly extending slot provided with a lateral extension at its lower end, and a bell-crank lever pivoted on the frame of the machine said bell-crank lever having one arm weighted and the other arm carrying a pin engaging the slot in the substantially horizontal lever and adapted when the dog is raised to engage the lateral extension of the said slot, whereby the descent of the pillar and dog is controlled.

4. Tabulating mechanism of typewriting machines comprising, in combination with a spring-driven paper-carriage controlled by an escapement device, a tabulating key, a vertically-movable pillar carrying a tabulating dog, means whereby the said pillar and dog are raised when the tabulating key is depressed, means whereby the paper-carriage is disconnected from the escapement device when the pillar and dog are raised and is re-connected thereto when the pillar and dog are lowered, means independent of the tabulating key for causing the pillar to be held in its raised position, a margin stop on the paper-carriage, a spring-controlled slide adapted to be engaged and operated by the margin stop, a projecting part on the slide adapted to release the dog from its raised position, and a spring which acts upon the pillar in order to lower the same when the dog is released.

In testimony whereof we have affixed our signatures.

ERNEST WILLIAM BACHE.
JOHN GRICE.